United States Patent [19]

Lehner et al.

[11] 4,334,034
[45] Jun. 8, 1982

[54] PROCESS FOR THE PREPARATION OF POLYMERIZABLE POLYURETHANE ELASTOMERS

[75] Inventors: August Lehner, Roedersheim-Gronau; Heinrich Hartmann, Limbergerhof; Guenter Heil, Ludwigshafen; Werner Lenz, Bad Durkheim; Ingolf Buethe, Mannheim; Rudolf Bachmann, Frankenthal, all of Fed. Rep. of Germany

[73] Assignee: BASF Aktiengesellschaft, Ludwigshafen, Fed. Rep. of Germany

[21] Appl. No.: 231,836

[22] Filed: Feb. 5, 1981

[30] Foreign Application Priority Data

Feb. 11, 1980 [DE] Fed. Rep. of Germany ....... 3005035

[51] Int. Cl.$^3$ ..................... C08G 63/76; C08G 18/62
[52] U.S. Cl. ................. 525/28; 204/159.16; 204/159.19; 525/440; 525/451
[58] Field of Search ................. 260/75; 525/28, 440, 525/451

[56] References Cited

U.S. PATENT DOCUMENTS 3,478,126  11/1969  Turpin ................................ 525/28
3,876,726  4/1975  Ford et al. ......................... 525/28
4,182,830  1/1980  Ford .................................. 525/440

*Primary Examiner*—H. S. Cockeram
*Attorney, Agent, or Firm*—David L. Hedden; Joseph D. Michaels

[57] ABSTRACT

A process for the preparation of polymerizable, primarily linear thermoplastic polyurethane elastomers with acrylate side groups comprising reacting an organic polyisocyanate with a mixture of (a) an acrylate diol having a molecular weight of 146 to 3000,
(b) an organic polyhydroxyl compound other than those of paragraph (a) having a molecular weight between 400 and 5000, and
(c) a chain extender selected from the group consisting of diols, diamines, aminoalcohols, and triols, having molecular weights between 61 and 400, water, and mixtures thereof wherein the ratio of isocyanate to active hydrogen containing groups is from 0.8:1 to 1.2:1 and wherein 1.4 to 1.8 moles of organic polyisocyante, 0 to 15 moles of component (c) and 0.3 to 6 moles of component (a) are used per mole of component (b). The polymerizable polyurethane elastomers may be used for the manufacture of molded parts, laminates, adhesives, coatings, magnetic tapes, and other articles.

7 Claims, No Drawings

PROCESS FOR THE PREPARATION OF POLYMERIZABLE POLYURETHANE ELASTOMERS

BACKGROUND OF THE INVENTION

1. Field of the Invention

This invention relates to a process for the preparation of polymerizable primarily linear thermoplastic polyurethane elastomers with acrylate side groups. The elastomers are soluble in organic solvents, and may be cross-linked by conventional curing techniques.

2. Description of the Prior Art

It is known that cross-linkable polyurethanes can be produced by incorporating therein unsaturated diols such as butene diol. However, the reactivity of these double bonds is so low that cross-linking is difficult to implement.

It is also known that polyurethanes with acrylate double bonds at the end of the polyurethane chain can be prepared. The problem with these products, however, is that they have chains with many double bonds and are either too short or too branched. Both properties result in polyurethane elastomers of poor mechanical properties.

SUMMARY OF THE INVENTION

A process has been discovered for the preparation of polymerizable, primarily linear thermoplastic polyurethane elastomers with acrylate side groups comprising reacting an organic polyisocyanate with a mixture of
(a) an acrylate diol having a molecular weight of 146 to 3000,
(b) an organic polyhydroxyl compound other than those of paragraph (a) having a molecular weight between 400 and 5000, and
(c) a chain extender selected from the group consisting of diols, diamines, aminoalcohols, and triols having a molecular weight between 61 and 400, water, and mixtures thereof
wherein the ratio of isocyanate to active hydrogen containing groups is from 0.8:1 to 1.2:1 and wherein 1.4 to 1.8 moles of diisocyanate, 0 to 15 moles of component (c) and 0.3 to 6 moles of component (a) are used per mole of component (b).

As was previously mentioned, the laterally crosslinkable resins known in the art are lacking with respect to their bending properties even in applications where they definitely meet rigidity requirements. This is due primarily to their low molecular weights. Contrary to this, the polymerizable thermoplastic polyurethane elastomers of this invention undergo increased polyaddition compared with the known cross-linkable synthetic resins. This is because polymerizable unsaturated groups are retained during and after the polyurethane manufacture. In other words, several polymerizable unsaturated groups may be introduced into the molecules. Correspondingly, the curability of the product is not reduced by too high a degree of polymerization. In addition to these favorable conditions with respect to the combination of the high degree of polymerization and the good curing properties, the cured and uncured elastomers of this invention have an improved degree of elasticity.

The polyurethane elastomers can be cross-linked by conventional curing methods. The cross-linked elastomers are markedly superior to the non-cross-linked polyurethanes with respect to their adhesion to metals and plastics, water resistance, solvent resistance, and weather resistance. The softening point of the unsaturated polyurethane elastomers, which may be additionally cross-linked by polymerization, is increased when compared with similar elastomers known in the art. The excellent resistance to water and weather is also due to the cross-linking. This combination of excellent properties enable the cross-linked elastomers to be used for a wider area of application than was possible with the previously known cross-linked synthetic resins.

In addition to this, the elastomers are considerably improved with respect to their mechanical properties and their chemical resistance, primarily with respect to their resistance to solvents, when they are used as coatings. These properties also are due to the high molecular weight and the presence of the urethane bonds, as well as the presence of the still polymerizable unsaturated side groups in the molecule.

The polymerizable polyurethane elastomers produced in accordance with this invention may be used for the manufacture of molded parts, laminates, adhesives, coatings, magnetic tapes, and other articles.

DESCRIPTION OF THE PREFERRED EMBODIMENT

Suitable polyisocyanates which can be used to prepare the polyurethane elastomers of this invention include the compounds familiar from the polyurethane chemistry and particularly diisocyanates. Aromatic as well as aliphatic or heterocyclic diisocyanates may be used such as 4,4-diphenylmethane diisocyanate, dicyclohexylmethane diisocyanate, 1,5-naphthalene diisocyanate, 2,4-and 2,6-tolulene diisocyanate, hexamethylene diisocyanate, isophorone diisocyanate, and trimethylhexamethylene diisocyanate and dicyclohexylmethane diisocyanate. Particularly well suited are diphenylmethane diisocyanate, isophorone diisocyante, hexamethylene diisocyanate, and dicyclohexylmethane diisocyanate. In some special cases, partially capped polyisocyanates may be used which facilitate the formation of additionally cross-linking polyurethanes, for instance, dimeric tolulene diisocyanate or polyisocyanates partially reacted, for instance, with phenol, tertiary butanol, phthalimide, or caprolactam.

Suitable acrylic ester diols which may be employed in this invention to prepare the polyurethane elastomers have molecular weights between 146 and 3000 and are reaction products of epoxide compounds with polymerizable olefinically unsaturated carboxylic acids, particularly acrylic and methacrylic acid, with approximately one carboxyl group per epoxide group. Also suitable are reaction products of dicarboxylic acids with polymerizable olefinically unsaturated glycidyl compounds. These compounds are described in German Published Application No. 2,164,386 which is hereby incorporated into this application by reference. Reaction products of hydroxyl-group carrying monoepoxides such as glycidol with methacrylic acid may also be used as unsaturated acryulic ester diols.

Suitable epoxides which can be used in preparing the acrylic ester diols include epoxides with two terminal epoxide group having the general formula

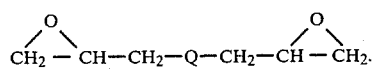

In this formula, Q represents a two bond radical such as

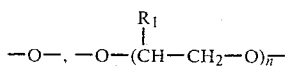

with n=1–10 and $R_1$ is hydrogen or methyl; —O—$(CH_2)_m$—O— radical with m=1 to 10; or Q stands for a radical having the general formula

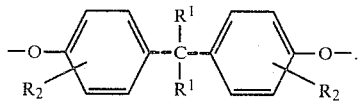

This radical can be derived from 4,4-dihydroxydiphenylmethane, Bisphenol A, or core-substituted derivatives of these compounds, such as alkyl, halo, amino, and nitro substituted derivatives.

During the later reaction with the diisocyanates, the reaction products of the epoxide compounds with acrylic and/or methacrylic acid should be largely bifunctional relative to the hydroxyl groups. With a hydroxyl functionality of >3, there is a danger of cross-linking.

The reaction of the epoxide compounds and the polymerizable olefinically unsaturated acid monomers is a ring opening esterification between the diepoxide groups of the polymerizable methacrylic acid which may be carried out in the familiar manner similar to the mode of operation set forth in German Published Application No. 2,164,386.

The above-referenced epoxide compounds and their reaction products may be used alone or as mixtures. Reaction products of Bisphenol A-diglycidyl ether (for instance, Epikote ®828 by Shell) or glycidol with acrylic or methacrylic acid are preferably suited as the acrylic ester diol.

Suitable organic polyhydroxyl compound which can be used in conjunction with the acrylic ester diols to prepare the polyurethane elastomers have molecular weights between 400 to 5000, preferably between 500 to 4000, and are selected from the group consisting of linear polyesters, polyethers, polycarbonates, polylactones (for instance polycaprolactone), and mixtures thereof. In addition to terminal hydroxyl groups, such compounds may also contain carboxyl, amino or mercapto groups. The polyethers include the polymerization products of ethylene oxide, propylene oxide, tetrahydrofuran, butylene oxide, as well as their mixed or graft polymerization products, as well as condensates obtained by the condensation of multifunctional alcohols or mixtures thereof, or products obtained by the alkoxylation of multifunctional alcohols.

The polyesters include esterification products of adipic acid with $C_2$–$C_{10}$ alkane diols or oxyalkane diols. The polycarbonates include, for instance, hexanediol polycarbonates. Particularly well suited polyols include polytetrahydrofuran (molecular weight 1000 and molecular weight 2000), polypropylene glycol (molecular weight 1000); adipates (having a molecular weight between 940 and 2000) prepared from glycols such as diethylene glycol (molecular weight 2000), 1,4-butanediol (molecular weight 940), mixtures of 1,6-hexanediol and 1,4-butanediol in a 1:1 molar ratio (molecular weight 1000 or 2000), mixtures of 1,6-hexanediol and 2,2-dimethyl-trimethylene glycol (molecular weight 1000); polycaprolactones (molecular weight 830 and 2000). Mixtures of these polyols may, of course, also be used.

Suitable as chain extenders are diols, diamines, amino alcohols, and triols, with molecular weights between 61 and 400. Representative examples include saturated or unsaturated glycols such as ethylene glycol or condensates of ethylene glycol, butanediol, propylene glycol, trimethylene glycol, neopentyl glycol, 1,6-hexanediol, 1,10-decanediol, dihydroxyethoxy hydroquinone, butene diol, dihydroxyethyldiane, mono- or bis-alkoxylated aliphatic, cycloaliphatic, aromatic or heterocyclic primary and secondary amines such as ethanolamine, N-methylethanolamine, N-butylethanolamine, N-oleylethanolamine, N-cyclohexylisopropanolamine, polyethoxylated N-butylethanolamine, tertiary amines such as N-methyldiethanolamine, N-butyldiethanolamine, N,N-bis-α-aminopropyl-N-methylamine, N-oleyldiethanolamine, N-cyclohexyldiisopropanolamine, N-N-dihydroxyethyl-p-toluidene, N,N-dihydroxypropylnaphthylamine, polyethoxylated N-butyldiethanolamine, the aliphatic, cycloaliphatic or aromatic diamines such as ethylene diamine, hexamethylene diamine, 1,4-cyclohexylene diamine, benzidine, diaminodiphenylmethane, the isomers of phenylene diamine or hydrozine, aminoalcohols such as ethanolamine, propanolamine or butanolamine. Under certain circumstances, water may also be used as chain extender or may be used in part as chain extender. Multifunctional alcohols such as trimethylolpropane, glycerine, and so forth, should be used in quantities of less than 10 equivalency percent.

In accordance with the invention, the elastic and thermoplastic properties may be adjusted within wide limits by varying the ratio of diol (c) to polymeric diol (b) and acrylate diol (a). Components (a), (b) and (c) are generally used in quantities of 100:(10 to 400):(0 to 30), preferably 100:(20 to 300):(1 to 20).

The reaction forming the polyurethane elastomer is preferably carried out in the presence of an organic solvent. In selecting the solvent, care must be taken that no solvent is used in the manufacture of polyurethane which contains functional groups which react with the isocyanate groups under the reaction conditions. Any desired solvent which does not react with the polyurethane mass and the reaction components may be used for the process of this invention. Preferred solvents are possibly halogenated hydrocarbons, ketones, tertiary alcohols, ethers, esters or nitriles, such as acetone, methylethylketone, tertiary butanol, acetylnitrile, ethylacetate, methylene chloride, chloroform, carbon tetrachloride, dimethylformamide, dimethylsulfoxide, tetrahydrofuran or dioxane. Mixtures of such solvents of course may also be used.

The polyurethanes are produced in solution or by batch method under the polyaddition conditions normally used and described in the literature. Since the polyurethanes produced according to this invention are frequently processed in solution, the solution polymerization is appropriately preferred for the preparation of polyurethanes. The single and two stage processes are available for this manufacture.

For the single stage method, all reaction components are placed into part of the solvent and are heated to 30° C. to 70° C. while being stirred. During the reaction which results in an increase of the viscosity, the mixture is diluted to the desired end concentrations in stages and the reaction is subsequently stopped, for instance, with alcohols or secondary amines. In the case of the two step process, the polyol and the diisocyanate is placed into part of the solvent and this mixture is heated to 30° C. to 70° C. while being stirred. Following a reaction period of approximately ½ to 2 hours, the chain extender is added while the mixture is being stirred and is kept at approximately 30° C. to 70° C. for a period of approximately ½ to 3 hours. The remainder of the reaction takes place as described for the single step mode of operation. The polyaddition may be carried out with or without catalysts. Suitable catalysts include tertiary amines such as triethylene diamine, metal salts such as potassium acetate, and organic metal compounds such as dibutyltin dilaurate.

According to this invention, the ratio of isocyanate groups to reactive hydrogen atoms is between 0.8:1 and 1.2:1, preferably between 0.95:1 and 1.15:1. This facilitates achievement of a K value >25, preferably >35. If the amount of the diisocyanate used is less than listed, the polyaddition reaction cannot be complete so that it is difficult to achieve the compounds in accordance with this invention. However, if the amount of the added diisocyanate is greater than referenced, the excess of isocyanate groups compared with the hydroxyl groups result in a hardening of the reaction mixture during the reaction or during storage and/or the K value is not reached.

The polymerizable unsaturated and urethanized compounds produced in accordance with this invention may be used alone or as a mixture with other basically familiar cross-linkable monomers and polymers. For instance, they may possibly also be mixed with polymerizable vinyl monomers. Generally, from 6 to 50 percent by weight of carbon to carbon double bond containing mono- or polymers may be added.

The products may be cured in accordance with basically familiar methods. Suitable methods include the thermal curing by heating, irradiation with actinic light, or irradiation with ionizing radiation. If the material is cured thermally by heating, polymerization promoting reagents are advantageously added. These reagents may be selected from materials which are commonly used for this purpose. If actinic light, for instance ultraviolet light, is used for the curing, commonly used photo-sensitizing agents must be used. These include benzoine ether, benzophenone, benzylketals, acetophenons, thioxanthones and so forth, generally in quantities of 0.3 to 5 percent by weight relative to the unsaturated polyurethane.

The examples which follow will serve to illustrate the invention in more detail. The parts and percentages referred to in the examples are parts by weight and percentages by weight unless stated otherwise.

The following abbreviations are used in the examples for the reactants:

NPG = neopentylglycol
TR = trimethylolpropane
BD-1,4 = 1,4-butanediol
MDI = diphenylmethane diisocyanate
DBA = dibutylamine
THF = tetrahydrofuran (<0.05 percent $H_2O$)
DBZL = dibutyltin dilaurate
PE 1010 = polyester from adipic acid and 1,4-butanediol (molecular weight = 1000)
EPDA = acrylate diol produced by reacting acrylic acid with a bisglycidylether of bisphenol A, epoxide equivalency weight of approximately 190.
PhIC = phenylisocyanate

EXAMPLE 1

In a reaction vessel, 75 parts of PE 1010, 37.44 parts NPG, 38.9 parts EPDA (70 percent in acetone), 1.34 parts of TR and 663 parts THF are heated to 30° C. while being stirred. Then, 131.2 parts of MDI and 0.125 part of DBZL are added. The reaction is exothermic and heats up to approximately 50° C. At this point, another 0.125 part of DBZL are added and the mixture is heated to 60° C. Upon reaching 60° C. (approximately 10 minutes), another 0.125 part of DBZL are added. With progressing reaction (after approximately 2 hours), the viscosity increases slightly. After reaching a viscosity of approximately 150 to 200 centipoise (60° C.), the mixture is diluted to 20 percent with 470 parts of THF and the reaction is terminated by adding 10 parts of DBA. After 5 minutes, the mixture is stabilized with 7 parts of PhIC and is cooled.

EXAMPLES 2 AND 3

Examples 2 and 3 are carried out in accordance with a mode of operation set forth in Example 1. See Table 1 for quantities used.

EXAMPLE 4

In a reaction vessel, 210 parts (0.42 equivalents) PE 1010, 32.4 parts (0.72 equivalents) 1,4-BD, 1.34 parts of TR (0.03 equivalents) 310.8 parts EPDA (70 percent in acetone) (0.8 equivalents), and 208.75 parts MDI (1.67 equivalents) as well as 726 parts of THF are catalyzed with 0.125 part of DBZL while being stirred. The reaction is exothermic and the temperature increases to approximately 45° C. to 50° C. within a period of 30 minutes. Following this, another 0.125 part of DBZL are added and the mixture is heated to 60° C. After the end of the reaction (NCO=0 percent) the product is cooled.

EXAMPLE 5

Example 5 is carried out in accordance with the mode of operation put forth in Example 4. See Table 1 for quantities used.

TABLE 1

| | Composition (Equivalents) | | | | | | Dry Content | Viscosity | | |
|---|---|---|---|---|---|---|---|---|---|---|
| Example No. | PE 1010 | NPG | BD-1,4 | EPDA 70% ig | TR | MDI | % | (centipoise) | K-Value | Appearance |
| 1 | 0.15 | 0.62 | — | 0.2 | 0.03 | 1.00 | 19.3 | 1200 | 77.5 | slightly cloudy solution |
| 2 | 0.32 | — | 0.45 | 0.2 | 0.03 | 1.00 | 19.1 | 1500 | 78.4 | clear solution |
| 3 | 0.15 | 0.72 | — | 0.1 | 0.03 | 1.00 | 19.6 | 380 | 66.3 | clear solution |
| 4 | 0.42 | — | 0.72 | 0.8 | 0.03 | 1.67 | 45.5 | 250 | 28.7 | clear solution |
| 5 | 0.42 | — | 0.92 | 0.8 | 0.03 | 1.87 | 45.5 | — | — | clear solution (gels after |

TABLE 1-continued

| | Composition of Examples | | | | | | | | |
|---|---|---|---|---|---|---|---|---|---|
| | Composition (Equivalents) | | | | | | | | |
| Example No. | PE 1010 | NPG | BD-1,4 | EPDA 70% ig | TR | MDI | Dry Content % | Viscosity (centipoise) | K-Value Appearance |
| | | | | | | | | | cooling) |

Coatings were prepared from the elastomers according to the following procedure:
Application applied to a glass plate by means of a wiper:
  Examples 1-3 foil thickness 200 microns wet 3-4 foil thickness 100 microns wet.
Drying 12 hours at room temperature then 6 hours at 60° C. in a circulating drying chamber
  layer thickness dry: 40 to 50 microns
Electron-Irradiation band speed 15 meters per minute approximately equal to 7 MRad 160 killovolts accelerated electrons under $N_2$ atmosphere
  $O_2$ content: 120 ppm
Foil Examination 14 days after irradiation

TABLE 2

| | Foil Testing Results | | | | | | | | |
|---|---|---|---|---|---|---|---|---|---|
| Example No. | 25°/50° C. $Q_r$* N/mm$^2$ | 25°/50° E-Modulus N/mm$^2$ | 25°/50° C. $H_{PAL}$** S | ET °C. *** | 25°/50° C. $Q_R$* N/mm$^2$ | 25°/50° C. E-Modulus N/mm$^2$ | 25°/50° C. $H_{PAL}$** S | ET °C. *** | Layer Thickness in Microns |
| 1 | 26.6/19.8 | 700/88 | 137/80 | 140 | 56.6/27.3 | 810/180 | 148/88 | 168 | 40–50 |
| 2 | 48.1/32.3 | 25/11 | 21/21 | 130 | 57.6/48.6 | 100/31 | 35/29 | 182 | 40–50 |
| 3 | 48.1/32.3 | 620/39 | 142/63 | 107 | 49.8/18.7 | 760/180 | 147/76 | 143 | 40–50 |
| 4 | 3.4/0.8 | 24/<10 | 27/18 | 71 | 33.3/25.8 | 510/120 | 103/53 | 173 | 40–50 |
| 5 | 5.3/1.6 | 51/<10 | 27/21 | 100 | 37.7/20.0 | 600/150 | 70/43 | 204 | 40–50 |

*$Q_R$ = tear strength.
**$H_{PAL}$ = pendulum hardness according to Koenig in seconds.
***ET = softening point.
All irradiated polymers are insoluble in THF.

The embodiments of the invention in which an exclusive privilege or property is claimed are defined as follows:

1. A process for the preparation of polymerizable, primarily linear thermoplastic polyurethane elastomers with acrylate side groups comprising reacting an organic polyisocyanate with a mixture of
   (a) an acrylate diol having a molecular weight of 146 to 3000,
   (b) an organic polyhydroxyl compound other than those of paragraph (a) having a molecular weight between 400 and 5000, and
   (c) a chain extender selected from the group consisting of diols, diamines, aminoalcohols, and triols, having a molecular weight between 61 and 400, water, and mixtures thereof wherein the ratio of isocyanate to active hydrogen containing groups is from 0.8:1 to 1.2:1 and wherein 1.4 to 1.8 moles of organic polyisocyanate, 0 to 15 moles of component (c) and 0.3 to 6 moles of component (a) are used per mole of component (b).

2. The process of claim 1 wherein the polyurethane elastomer is produced by reacting the organic polyisocyanate with the mixture of components (a), (b) and (c) such that the ratio of isocyanate groups to active hydrogen atoms is from 0.95:1 to 1.15:1.

3. The process of claim 1 wherein 6 to 50 percent by weight of carbon to carbon double bond containing mono- or polymers are added to the polyurethane elastomer.

4. The process of claim 2 wherein 6 to 50 percent by weight of carbon to carbon double bond containing mono- or polymers are added to the polyurethane elastomer.

5. The process of claim 1 wherein the polyurethane elastomer is cured by heating or irradiation.

6. The process of claim 3 wherein the product is cured by heating or irradiation.

7. A polyurethane elastomer prepared in accordance with claims 1, 2, 3, 4, 5, or 6.

* * * * *